W. W. ANDERSON.
Combined Rollers and Harrows.

No. 158,012. Patented Dec. 22, 1874.

WITNESSES:
N. W. Almqvist
A. F. Terry

INVENTOR:
W. W. Anderson
BY
ATTORNEYS.

UNITED STATES PATENT OFFICE.

WILLIAM W. ANDERSON, OF WARTRACE, TENNESSEE.

IMPROVEMENT IN COMBINED ROLLERS AND HARROWS.

Specification forming part of Letters Patent No. 158,012, dated December 22, 1874; application filed November 21, 1874.

*To all whom it may concern:*

Figure 1:
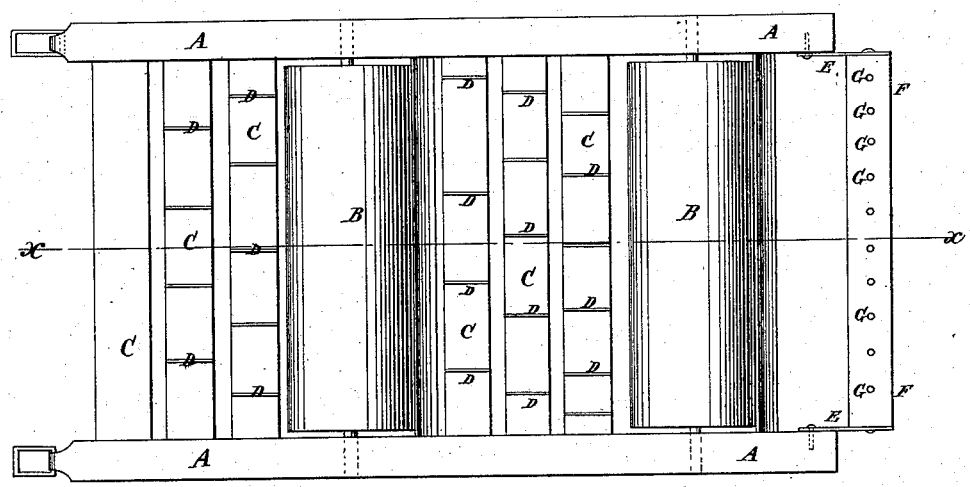
Figure 2:
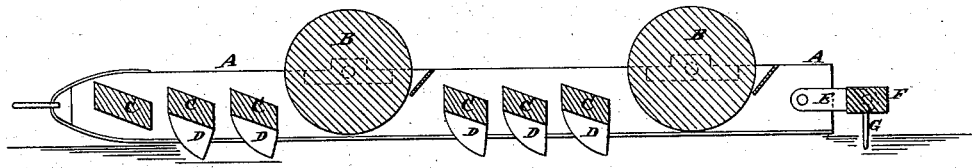

Be it known that I, WILLIAM W. ANDERSON, of Wartrace, in the county of Bedford and State of Tennessee, have invented a new and useful Improvement in Combined Roller and Harrow, of which the following is a specification:

Figure 1 is an under-side view of my improved machine. Fig. 2 is a vertical longitudinal section of the same, taken through the line $x\ x$, Fig. 1.

Similar letters of reference indicate corresponding parts.

My invention has for its object to furnish an improved harrow and roller for cultivating wheat, cutting up corn-stalks, weeds, &c., and smoothing the land ready for the harvester, and which shall be simple in construction, of light draft, and effective in operation. The invention consists in the combination of the two side beams, the two rollers, the cross-bars, and the cutters with each other; and in the combination of the pivoted bars, the cross-bar and its teeth with the side beams, the two rollers, the cross-bars, and the cutters, as hereinafter fully described.

A are two side beams or runners, the upper and lower corners of the forward ends of which are rounded off or beveled to enable them to readily pass over obstructions or unevenness in the surface of the ground. To the forward ends of the side beams A are attached the ends of a short chain, to the center of which the draft is attached. B are two rollers, placed, the one near the rear ends and the other a little in front of the center of the side beams A, and the journals of which revolve in bearings attached to the upper sides of said side beams. To the beams A, between the rollers B, are rigidly attached the ends of three cross-bars, C, the under sides of which are inclined upward in front, and to the lower sides of which are attached knives or cutters D, the forward corners of which are rounded off, as shown in Fig. 2. To the side beams A, in front of the forward roller B, are rigidly attached the ends of three cross-bars, C, exactly like the three rear cross-bars. To the two rear bars of the forward three are attached cutters D, exactly like the cutters attached to the rear cross-bars. The cutters D are so arranged upon the five cross-bars that no two of them will follow in the same path. The forward cross-bar C has no cutters attached to it, and is designed to break down stalks and weeds, and break in pieces any lumps and clods that may be upon the land.

With this construction, when the machine is placed in the position shown in Fig. 2, and is drawn forward, the cutters D will cut in pieces stalks and weeds and cultivate the wheat, while the rollers B will roll it, leaving the ground smooth for the harvester.

When only a roller is required, the machine is turned the other side up, as shown in Fig. 1, so that only the rollers will touch the ground.

To the rear ends of the side beams A are pivoted the forward ends of two short bars, E, to the rear ends of which are attached the end of a cross-bar, F, having teeth G attached to it to loosen up the soil in the rear of the rear roller when desired.

When not required for use, the bar F may be turned up, so that its teeth G will not come in contact with the ground.

H are two metal cross-bars, attached to the side beams A in such positions as to scrape off any soil that might adhere to the rollers B, and thus interfere with their proper action.

Having thus described my invention, I claim as new and desire to secure by Letters Patent—

1. The combination of the two side beams A, the two rollers B, placed the one in front of the other, the cross-bar C, and the cutters D, with each other, substantially as herein shown and described.

2. The combination of the pivoted bars E, the cross-bar F, and the teeth G with the side beams A, the two rollers B, the cross-bars C, and the cutters D, substantially as herein shown and described.

WILLIAM W. ANDERSON.

Witnesses:
THOMAS R. MYERS,
T. H. COLVIN.